Feb. 28, 1967 J. LOOS 3,307,121

HELICAL RESONATOR WITH COIL, ADJUSTABLE CONDUCTING PLATE AND SHIELD FORMING A SERIES RESONANT CIRCUIT

Filed Aug. 28, 1964

Inventor

Joseph Loos

By Mueller & Aichele

Attys.

United States Patent Office 3,307,121

Patented Feb. 28, 1967

3,307,121

HELICAL RESONATOR WITH COIL, ADJUSTABLE CONDUCTING PLATE AND SHIELD FORMING A SERIES RESONANT CIRCUIT

Joseph Loos, Morton Grove, Ill., assignor to Motorola Inc., Franklin Park, Ill., a corporation of Illinois

Filed Aug. 28, 1964, Ser. No. 392,758
11 Claims. (Cl. 334—6)

This invention relates to frequency responsive electrical apparatus, and more particularly to a helical resonator structure for use in very high frequency electronic equipment.

Helical resonators have been used as tuning elements in radio equipment and other electronic apparatus operating at very high frequencies. Such a helical resonator may include a helical inductance coil which is electrically connected in a circuit at only one end, and a conducting shield and/or other conducting elements adjacent the coil and capacity coupled thereto, to which a second circuit connection is made. The resonator may be tuned by moving a core within the coil to change its inductance, or by moving a conducting element with respect to the coil to change the capacity in series with the coil.

Helical resonators with capacity tuning have been found to be desirable in many applications, but present a problem in that for maximum tuning range the adjustable capacitor plate must be adjacent the free or high impedance end of the coil. In this construction, the adjustable positioning element extends from one end of the unit, and the connection to the coil from the opposite end, so that they are supported on different mounting bases creating thermal, shock and vibration instability problems.

Another problem encountered with helical resonators of the type referred too, is that the resonator coil has a substantial positive temperature coefficient. Accordingly, as the temperature changes, the resonant frequency will change, so that the equipment in which the resonator is used will not have the desired frequency response.

It is, therefore, an object of the present invention to provide a helical resonator which is constructed to provide a rugged stable unit.

Another object of the invention is to provide a helical resonator in which the coil is capacitively tuned, and wherein the connections and adjusting means are provided on a single mounting surface.

A further object of the invention is to provide a helical resonator including temperature compensating means for holding the resonant frequency within desired limits in the presence of wide temperature variations.

A feature of the invention is the provision of a helical resonator having a helical coil with an elongated connector extending from one end thereof in the direction of and beyond the second free end of the coil, and a conducting structure including a plate positioned adjacent the free end of the coil and an elongated support for moving the plate to change the capacity between the plate and the second end of the coil. The support and the connector may extend substantially parallel to one another to a common mounting structure, which also supports a shield for the resonator.

Another feature of the invention is the provision of a helical resonator having a coil mounted on a tubular ceramic form supported on a mounting base, with a connector extending from the mounting base to the remote end of the coil, and a conducting structure adjustably positioned on the mounting base and having a plate capacitively coupled to the end of the coil closest to the mounting base.

A further feature of the invention is the provision of a helical resonator including a coil and a capacitive tuning structure including a circular plate adjacent to the coil and an adjustable rod for supporting the plate, wherein the plate is formed of bi-metallic material so that the circular edge thereof moves with respect to the coil with changes in temperature to compensate for changes in the tuning of the resonator with changes in temperature.

The invention is illustrated in the drawing wherein.

In practicing the invention there is provided a helical resonator including a helical coil mounted on a ceramic form. The form is supported at one end thereof on a mounting base which also supports a shield about the coil. The end of the coil remote from the mounting base has a connector extending therefrom, which may be integral with the coil, and which is substantially parallel to the axis of the coil and extends to the mounting base. A capacitive plate is supported adjacent the free or high impedance end of the coil, which is the end nearest the mounting base, by an elongated supporting element which may be threaded in a fitting secured to the mounting base. The supporting element can be rotated to change the capacity to tune the resonator. The capacitive plate may be of circular configuration, and formed of bi-metallic material so that the circular edge thereof moves with respect to the high impedance end of the coil. The resonator can be tuned by adjusting the threaded support element to change the capacity between the plate and the coil, and the bi-metallic plate acts to adjust the resonant frequency to compensate for changes in the inductance of the coil resulting from its positive temperature coefficient due to thermal expansion and contraction. As the adjustable supporting element and the conductor extending from the coil both engage the same mounting base, mechanical stability with respect to temperature, shock and vibration is provided.

Figure 2:
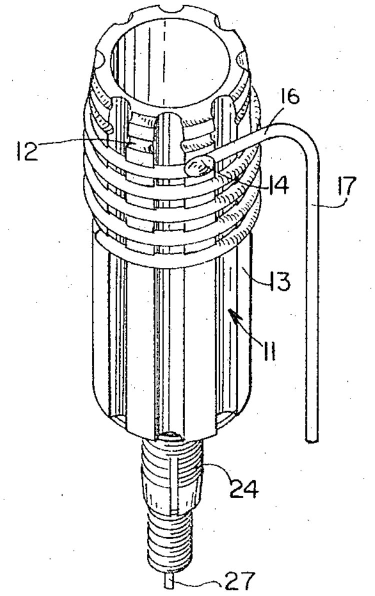
FIG. 2 is a perspective view of the coil and support form of the resonator of FIG. 1.
Figure 1:
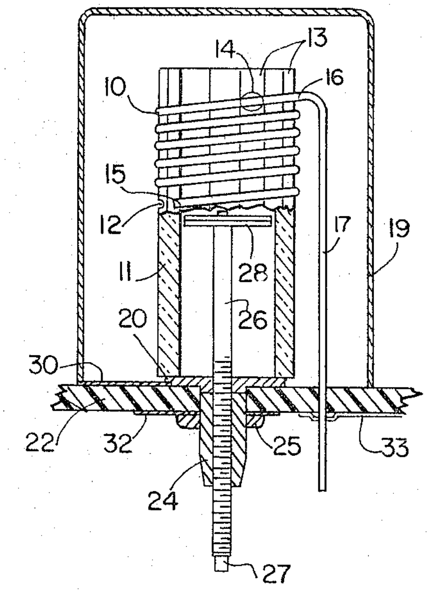
FIG. 1 is a cross sectional view of the helical resonator in accordance with the invention.

Referring now to the drawing, FIG. 1 illustrates the helical resonator of the invention. The helical coil 10 is supported on the tubular ceramic form 11. The coil 10 is positioned in grooves 12 provided in the ribs 13 extending longitudinally of the form 11. The coil may be anchored on the form by cement as illustrated at 14. The coil 10 has one end 15 which is free, not being connected in a conducting circuit. Extending from the opposite end 16 of the coil is a connector 17, which may be integral with the coil 10. The conductor 17 may extend through an opening in the mounting base 22, as shown. A conducting shield 19 surrounds the coil 10 and is supported on base 22.

The ceramic form 11 is secured to a metallic plate 20 supported on mounting base 22. The plate 20 has a sleeve 24 extending therefrom through an opening in the mounting base 22, and which is threaded to receive nut 25 to hold plate 20 positioned on the mounting base. The sleeve 24 has internal threads for receiving threaded shaft 26. The shaft 26 supports a conducting plate 28 which is positioned within the form 11. The shaft rotates within the sleeve to adjust the position of the plate 28 with respect to the free end of the coil 10.

In operation the helical resonator forms a series resonant circuit including the inductance of coil 15 and the capacitance between the coil and the adjustable plate 28. The conducting shield 19 is also capacity coupled to the coil, and this capacity is in parallel with the capacity between the coil and the plate 28. When an insulating mounting base 22 is used, as illustrated, the shield 19 may be connected through conducting strip 30 to the plate 20, and through the sleeve 24 and nut 25 to a conductor 32 on the bottom side of the mounting base 22. Similarly, a conductor 33 may be provided on the mounting base and connected to connector 17. The series resonant circuit formed by the helical resonator is therefore connected between conductors 32 and 33. The resonator may be provided on a conducting mounting base with the shield 19 directly connected thereto, and the plate 28 connected through conducting shaft 26, sleeve 24 and nut 25. The other connection can be made to connector 17, which must be insulated from a conducting mounting base.

The shield 19 provides the major portion of the capacity with the coil 10, with a small adjustable portion of the capacity being provided by the plate 28 which is positioned adjacent the high impedance end of the coil. The plate 28 has a diameter less than the diameter of the coil and is adjustably positioned with respect to the end of the coil to change the capacity. The position of plate 28 is changed by rotation of the threaded rod 26 which may have a flat end 27 to facilitate such adjustment.

Figure 4:
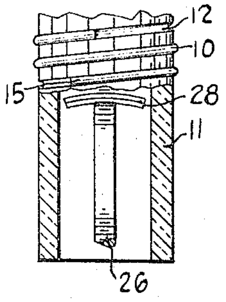
FIGS. 4 and 5 illustrate the temperature compensating action of the capacitive tuning element.

It is known that a coil, such as the coil 10, has an inductance which exhibits a positive temperature coefficient due to the thermal expansion and contractions of the turns. This change in the inductance of the coil 10 with temperature changes the tuning of the helical resonator. To compensate for this, the capacitor plate 28 may be constructed of a bimetal material so that the surface of the plate 28 cups to change the position of the edge thereof with change in temperature. The high expansion side of the material is placed on the coil side of the plate. Accordingly, when the temperature increases, the plate will cup downward as shown in FIG. 4. This will decrease the capacity between the plate and the coil to compensate for the increase in inductance with temperature.

Figure 3:
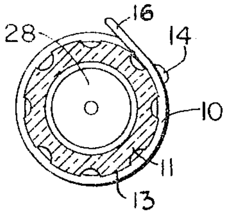
FIG. 3 is an end view of the coil, support form and capacitive tuning element.
Figure 5:
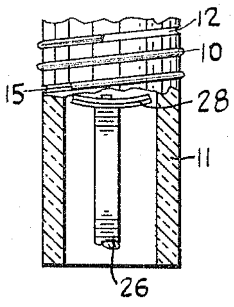

Similarly, when the temperature goes below the normal value, the plate will cup upward as shown in FIG. 5 to increase the capacity to compensate for reduced inductance of the coil. Since the plate 28 is of smaller diameter than the turns of the coil, as shown in FIG. 3, the capacity between the plate and the coil is controlled to a large degree by the capacity between the edge of the plate and the end turn of the coil. Accordingly, the movement of the edge of the plate from the normal position as shown in FIG. 1, to the position shown in FIGS. 4 and 5, will result in a sufficient change in capacity to provide the required compensation.

In a structure actually used wherein the coil diameter is of the order of one inch, the plate 28 has a diameter of 0.625 inch, and a thickness of 0.0035 inch. The plate 28 was made of Truflex No. P675R, a material produced by Metals and Controls Corporation, Attleboro, Massachusetts. The support rod 26 has a diameter of 0.125 inch. At a frequency of the order of 158 megacycles the change in frequency between minus 40° centigrade and plus 70° centigrade was less than 100 kilocycles. This compared to a change of more than 400 kilocycles when no temperature compensation was provided. The amount of compensation can be changed by changing the thickness or diameter of the plate 28, or by using a material having a different temperature characteristic.

It will be apparent that helical resonators having the advantageous features described may have other configurations than that shown in the drawing. For example, the adjustable capacitor plate may be of a different configuration and supported in a different way and still provide the desired action. Plates of other configurations can be made of a material which flexes with temperature so that a portion of the plate moves with respect to the coil to change the capacity and compensate for change in some other characteristic with temperature. This adjustable capacity feature can be used in devices other than a helical resonator wherein a capacity coupling is used.

In the application shown, a single plate provides both a trimming or preset adjustment in capacity to tune the resonator, and also flexes with temperature to compensate the resonator for change in the inductance with change in temperature.

The arrangement wherein the adjustable element and the connectors are all provided on a single mounting base renders the structure less susceptible to variations due to temperature, shock and vibration. This also results in a unit which can be easily provided on a chassis with other equipment.

I claim:

1. A helical resonator for operating at a predetermined frequency including in combination, a helical coil having first and second ends, elongated connector means extending from said first end of said coil in the direction of said second end of said coil and beyond said second end, conductor means including a conducting plate positioned adjacent said second end of said coil and support means for said plate extending away from said first end of said coil and generally parallel to said elongated connector means, and conductive shield means about said helical coil electrically connected to said conductor means, said shield means and said conducting plate being capacitively coupled in parallel relation to said coil so that a series resonant circuit is formed between said conductor means and said connector means, said support means being adjustable for moving said plate with respect to said second end of said coil to control the capacity therebetween to thereby control the frequency of operation of said helical resonator.

2. A helical resonator for operating at a predetermined frequency including in combination, a flat mounting base, a tubular insulating support extending perpendicular to said base and secured at one end to said base, a helical coil positioned on said support, elongated connector means extending from the end of said coil remote from said base to a position adjacent said base, a conducting plate positioned within said insulating support adjacent the end of said coil nearest said base, and conducting support means for said plate extending from said mounting base, said conducting plate being capacitively coupled to said last mentioned coil end so that a series resonant circuit is formed between said conductor means and said support means, said support means being adjustable for moving said conducting plate with respect to said coil to control the capacity therebetween to thereby control the frequency of operation of said helical resonator.

3. A helical resonator for operating at a predetermined frequency including in combination, a mounting base, a tubular insulating support secured at one end thereof to said base, a helical coil on said support, elongated connector means extending from the end of said coil remote from said base to a position adjacent said base, a conducting plate positioned within said insulating support adjacent the end of said coil nearest said base, said plate forming an electrical capacitance with said last mentioned coil end, conducting support means for said plate extending from said mounting base, and conductive shield means about said helical coil electrically connected to said support means and forming a further electrical capacitance with said coil, said support means being adjustable for moving said conducting plate with respect to said coil to control the capacitance therebetween to thereby control the frequency of operation of said helical resonator.

4. A helical resonator for operating at a predetermined frequency including in combination, a mounting base, a tubular insulating support secured at one end of said base, a helical coil positioned on said support and having first and second ends, elongated connector means integral with said coil and extending from said first end of said coil which is remote from said base toward said base, said second end of said coil which is nearest said base being free of circuit connections and presenting high impedance, a conducting plate positioned within said support and adjacent said second end of said coil, conducting support means for said plate extending from said mounting base, and conductive shield means about said helical coil electrically connected to said support means, said conducting plate and said conductive shield means being capacitively coupled to said helical coil and forming a resonant circuit therewith, said support means being adjustable for moving said conducting plate with respect to said second end of said coil to control the capacity therebetween to thereby control the frequency of operation of said helical resonator.

5. A helical resonator for operating at a predetermined frequency including in combination, a helical coil having first and second ends, elongated connector means extending from said first end of said coil, said second end of said coil being free of circuit connections and presenting a high impedance, conductor means including a conducting plate positioned adjacent said second end of said coil, said conducting plate being capacitively coupled to said second end of said coil, and support means for said plate, said support means being adjustable for moving said plate with respect to said second end of said coil, said plate being formed of material which flexes with change in temperature so that the position of a portion of said plate with respect to said second end of said coil changes with temperature, the position of said plate determining the capacity coupled to said coil to control the frequency of the resonator and to compensate for the change in frequency of the resonator with change in temperature.

6. A helical resonator for operating at a predetermined frequency including in combination, a mounting base, a tubular insulating support secured at one end thereof to said base, a helical coil on said support having an unconnected coil end adjacent said one end of said support to form a high impedance portion in said coil, elongated connector means extending from said base to said end of the coil remote from said base, a conducting plate positioned adjacent said high impedance portion, conducting support means for said plate extending from said mounting base, said support means being adjustable for moving said plate with respect to said coil high impedance portion to control the capacity therebetween to thereby control the frequency of operation of said helical resonator, said plate being formed of bi-metallic material so that the position of a portion thereof with respect to said coil high impedance portion changes with change in temperature, whereby the capacity between said plate and said coil changes with temperature to compensate for the change in inductance of said helical coil with change in temperature.

7. A helical resonator for operating at a predetermined frequency including in combination, a flat mounting base, a tubular insulating support extending perpendicular to said base and secured at one end to said base, a helical coil positioned on said support and having a high impedance portion, elongated connector means extending from said ends of said coil remote from said base to a position adjacent said base, a conducting plate positioned within said insulating support adjacent said high impedance portion and in capacitive relation therewith, conducting support means for said plate extending from said mounting base, said support means being adjustable for moving said plate with respect to said coil high impedance portion to control the capacity therebetween to thereby control the frequency of operation of said helical resonator, said plate being of circular configuration and being formed of bi-metallic material, so that the position of the circular edge thereof with respect to the end of said coil nearest said base changes with change in temperature, whereby the capacity between said plate and said coil changes with temperature to compensate for the change in inductance of said helical coil with change in temperature.

8. A helical resonator for operating at a predetermined frequency including in combination, a mounting base, a tubular insulating support extending perpendicular to said base and secured at one end thereof to said base, a helical coil positioned on said support and having a first end remote from said base and a second end nearer said base, elongated connector means integral with said coil extending from said first end thereof to said base, said second end of said coil being free of circuit connections and presenting a high impedance, a conducting plate positioned within said support and adjacent said second end of said coil, conducting support means for said plate extending from said mounting base, and conducting shield means about said helical coil supported on said base and electrically connected to said support means, said conducting plate and said shield means being capacitively coupled to said coil, said support means being adjustable for moving said plate with respect to said second end of said coil to control the capacity therebetween to thereby control the frequency of operation of said helical resonator, said plate being of circular configuration and being formed of bi-metallic material which flexes with temperature, so that the position of the circular edge thereof with respect to said second end of said coil changes with change in temperature, whereby the capacity between said plate and said coil changes with temperature to compensate for the change in inductance of said helical coil with change in temperature.

9. A helical resonator for operating at a predetermined frequency including in combination, a mounting base, a tubular insulating support extending perpendicular to said base and secured at one end thereof to support said base, a helical coil positioned on said support and having a first end remote from said base and a second end nearer said base, elongated connector means integral with said coil extending from said first end thereof to said base, said second end of said coil being free of circuit connections and presenting a high impedance, a conducting plate positioned within said support and adjacent said second end of said coil, conducting support means for said plate extending from said mounting base, and conducting shield means about said helical coil supported on said base and electrically connected to said support means, said conducting plate and said shield means being capacitively coupled to said helical coil, said support means being adjustable for moving said plate with respect to said second end of said coil to control the capacity therebetween to thereby control the frequency of operation of said helical resonator, said plate being of circular configuration and being formed of bi-metallic material which flexes with temperature, said plate being positioned with the high expansion side adjacent said coil so that the circular edge of said plate moves away from said second end of said coil as the temperature increases to decrease the capacity, and moves toward said second end of said coil as the temperature decreases to increase the capacity between said plate and said coil, to thereby compensate for the increase in inductance of said helical coil with increase in temperature and the decrease in inductance of said helical coil with decrease in temperature.

10. A frequency responsive device for operating at a predetermined frequency including in combination, a coil, a conducting plate positioned adjacent and in capacitive relation to one end portion of said coil, and conducting support means for said plate which is adjustable for moving said plate with respect to said one end portion to control the capacity therebetween to thereby control the frequency of operation of said device, said plate being of circular configuration and being formed of bi-metallic material which flexes with temperature, so that the position of the circular edge thereof with respect to said one end portion of said coil changes with change in temperature, whereby the capacity between said plate and said coil changes with temperature to temperature compensate said device.

11. A frequency responsive device for operating at a predetermined frequency including in combination, reactance means having only one terminal, conductor means including a conducting plate positioned in capacitive relation to said reactance means and forming an electrical circuit between said terminal and said conductor means, and a conducting support for said plate which is adjustable for moving said plate to control the capacity between said plate and said reactance means to control the frequency of operation of said circuit, said plate being formed of material which flexes with change in temperature so that the position of a portion of said plate with respect to said reactance means changes with temperature, to thereby change the capacity between said plate and said reactance means with change in temperature to temperature compensate said device.

References Cited by the Examiner

UNITED STATES PATENTS

| | | | |
|---|---|---|---|
| 2,135,841 | 11/1938 | Polydoroff et al. | 334—74 |
| 2,158,493 | 5/1939 | Brailsford et al. | 336—136 |
| 2,179,417 | 11/1939 | Maxham | 317—248 |
| 2,189,461 | 2/1940 | Donle | 334—76 |

| | | | |
|---|---|---|---|
| 2,439,809 | 4/1948 | Hunter | 334—5 |
| 2,505,791 | 5/1950 | Rennick | 336—136 |
| 2,516,287 | 7/1950 | Aske | 334—68 |
| 2,911,530 | 11/1959 | Nestlerode et al. | 334—76 |
| 2,980,796 | 4/1961 | Mason | 334—73 |
| 2,989,630 | 6/1961 | Crooker | 334—68 |
| 2,999,156 | 9/1961 | Mason et al. | 334—73 |

OTHER REFERENCES

Television Topics, The Wireless World, June 9, 1938, page 509 relied on.

References Cited by the Applicant

UNITED STATES PATENTS

| | | |
|---|---|---|
| 1,798,012 | 3/1931 | Cohen et al. |
| 2,423,824 | 7/1947 | Beetham. |
| 2,483,801 | 10/1949 | Becwar. |
| 2,502,202 | 3/1950 | Burroughes. |

ELI LIEBERMAN, *Primary Examiner.*

HERMAN KARL SAALBACH, R. F. HUNT, R. D. COHN, *Assistant Examiners.*